(12) United States Patent
Spivack

(10) Patent No.: US 11,417,066 B2
(45) Date of Patent: *Aug. 16, 2022

(54) SYSTEM AND METHOD FOR SELECTING TARGETS IN AN AUGMENTED REALITY ENVIRONMENT

(71) Applicant: Samsung Electronics Co., Ltd., Suwon-si (KR)

(72) Inventor: Nova T. Spivack, Sherman Oaks, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/101,429

(22) Filed: Nov. 23, 2020

(65) Prior Publication Data

US 2021/0104101 A1 Apr. 8, 2021

Related U.S. Application Data

(63) Continuation of application No. 16/543,011, filed on Aug. 16, 2019, now Pat. No. 10,878,636, which is a
(Continued)

(51) Int. Cl.
*G06T 19/00* (2011.01)
*G09G 5/377* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 4,519,490 A 5/1985 White
4,829,899 A 5/1989 Wiker et al.
(Continued)

FOREIGN PATENT DOCUMENTS

EP 0 926 614 A2 6/1999
KR 10-2011-0133655 A 12/2011
(Continued)

OTHER PUBLICATIONS

International Search Report PCT/US2010/035282 dated Feb. 1, 2001; pp. 1-3.
(Continued)

*Primary Examiner* — Ryan M Gray
(74) *Attorney, Agent, or Firm* — Jefferson IP Law, LLP

(57) ABSTRACT

Techniques are disclosed for facilitating electronic commerce in an augmented reality environment. In some embodiments, a method comprises detecting, by a mobile device, presence of the physical product or the real life service; and presenting, on the mobile device, information to conduct the transaction of a physical product or a real life service via the augmented reality environment. In some embodiments, a method comprises detecting one or more targets in the augmented reality platform using a select area in a perspective of a user, the perspective being captured by a mobile device; and prompting the user to choose an object of interest from the one or more detected targets.

16 Claims, 11 Drawing Sheets

Related U.S. Application Data continuation of application No. 14/939,889, filed on Nov. 12, 2015, now Pat. No. 10,388,070, which is a continuation of application No. 13/874,421, filed on Apr. 30, 2013, now abandoned.

(60) Provisional application No. 61/640,856, filed on May 1, 2012.

(51) Int. Cl.
| | | |
|---|---|---|
| *G06F 3/01* | (2006.01) | |
| *G06V 20/20* | (2022.01) | |
| *G06Q 30/06* | (2012.01) | |
| *G02B 27/01* | (2006.01) | |
| *G06F 3/0488* | (2022.01) | |

(52) U.S. Cl.
CPC .............. *G06F 3/013* (2013.01); *G06F 3/017* (2013.01); *G06F 3/0488* (2013.01); *G06Q 30/0623* (2013.01); *G06Q 30/0639* (2013.01); *G06Q 30/0641* (2013.01); *G06Q 30/0643* (2013.01); *G06V 20/20* (2022.01); *G09G 5/377* (2013.01); *G02B 2027/0178* (2013.01)

(56) References Cited

U.S. PATENT DOCUMENTS

| | | |
|---|---|---|
| 5,009,598 A | 4/1991 | Bennington |
| 5,450,590 A | 9/1995 | Elko et al. |
| 5,600,777 A | 2/1997 | Wang et al. |
| 5,604,907 A | 2/1997 | Conner et al. |
| 5,616,030 A | 4/1997 | Watson |
| 5,623,657 A | 4/1997 | Conner et al. |
| 6,023,270 A | 2/2000 | Brush, II et al. |
| 6,028,593 A | 2/2000 | Rosenberg et al. |
| 6,050,898 A | 4/2000 | Vange et al. |
| 6,080,063 A | 6/2000 | Khosla |
| 6,241,609 B1 | 6/2001 | Rutgers |
| 6,292,798 B1 | 9/2001 | Dockter et al. |
| 6,302,941 B1 | 10/2001 | Oya et al. |
| 6,314,167 B1 | 11/2001 | Johnson et al. |
| 6,549,893 B1 | 4/2003 | Lannert et al. |
| 6,572,380 B1 | 6/2003 | Buckley et al. |
| 6,680,909 B1 | 1/2004 | Bansal et al. |
| 6,842,175 B1 | 1/2005 | Schmalstieg et al. |
| 6,983,232 B2 | 1/2006 | Nguyen et al. |
| 7,054,848 B1 | 5/2006 | Lannert et al. |
| 7,065,553 B1 | 6/2006 | Chesley et al. |
| 7,072,919 B2 | 7/2006 | Sexton et al. |
| 7,155,496 B2 | 12/2006 | Froyd et al. |
| 7,349,840 B2 | 3/2008 | Budzinski |
| 7,353,160 B2 | 4/2008 | Voigt |
| 7,487,177 B2 | 2/2009 | Kilian-Kehr et al. |
| 7,516,052 B2 | 4/2009 | Hatcherson et al. |
| 7,543,238 B2 | 6/2009 | Alcazar et al. |
| 7,545,225 B2 | 6/2009 | Beccue |
| 7,570,261 B1 | 8/2009 | Edecker et al. |
| 7,685,508 B2 | 3/2010 | Froyd et al. |
| 7,702,693 B1 | 4/2010 | Aiyagari et al. |
| 7,739,479 B2 | 6/2010 | Bordes et al. |
| 7,797,168 B2 | 9/2010 | Kusumoto et al. |
| 7,824,268 B2 | 11/2010 | Harvey et al. |
| 7,859,551 B2 | 12/2010 | Bulman et al. |
| 7,890,419 B2 | 2/2011 | Jung et al. |
| 7,955,168 B2 | 6/2011 | Mendelsohn et al. |
| 7,991,706 B2 | 8/2011 | Mattern |
| 7,996,264 B2 | 8/2011 | Kusumoto et al. |
| 8,046,338 B2 | 10/2011 | Basso et al. |
| 8,138,930 B1 | 3/2012 | Heath et al. |
| 8,181,152 B2 | 5/2012 | Choi et al. |
| 8,191,121 B2 | 5/2012 | Ruppert et al. |
| 8,192,283 B2 | 6/2012 | Ruppert et al. |
| 8,201,229 B2 | 6/2012 | Ruppert et al. |
| 8,205,092 B2 | 6/2012 | Stokes |
| 8,246,467 B2 | 8/2012 | Huang et al. |
| 8,279,862 B2 | 10/2012 | Sbisa et al. |
| 8,287,383 B1 | 10/2012 | Etter et al. |
| 8,303,387 B2 | 11/2012 | Spivack |
| 8,307,273 B2 | 11/2012 | Pea et al. |
| 8,494,498 B2 | 7/2013 | Kwon |
| 8,532,340 B2 | 9/2013 | Kruglick |
| 8,566,786 B2 | 10/2013 | Choi et al. |
| 8,610,771 B2 | 12/2013 | Leung et al. |
| 8,630,620 B2 | 1/2014 | Cha et al. |
| 8,660,679 B2 | 2/2014 | Kurabayashi et al. |
| 8,682,879 B2 | 3/2014 | Kim et al. |
| 8,719,077 B2 | 5/2014 | Titus et al. |
| 8,732,025 B2 | 5/2014 | Gokturk et al. |
| 8,745,494 B2 | 6/2014 | Spivack |
| 8,805,110 B2 | 8/2014 | Rhoads et al. |
| 8,866,847 B2 | 10/2014 | Bedi et al. |
| 8,947,455 B2 | 2/2015 | Friesen |
| 8,947,456 B2 | 2/2015 | Chen et al. |
| 8,957,835 B2 | 2/2015 | Hoellwarth et al. |
| 9,001,252 B2 | 4/2015 | Hannaford |
| 9,031,809 B1 | 5/2015 | Kumar et al. |
| 9,047,700 B2 | 6/2015 | Ur |
| 9,077,771 B2 | 7/2015 | Kruglick |
| 9,105,207 B2 | 8/2015 | Leung |
| 9,196,094 B2 | 11/2015 | Ur |
| 9,215,530 B2 | 12/2015 | Kurabayashi et al. |
| 9,257,089 B2 | 2/2016 | Ur |
| 9,280,853 B2 | 3/2016 | Ur |
| 9,390,503 B2 | 7/2016 | Leung et al. |
| 9,486,707 B2 | 11/2016 | Kruglick |
| 11,170,286 B2 * | 11/2021 | Dolignon ................ G06N 5/02 |
| 2001/0053968 A1 | 12/2001 | Galitsky et al. |
| 2002/0010734 A1 | 1/2002 | Ebersole et al. |
| 2002/0029298 A1 | 3/2002 | Wilson |
| 2002/0133325 A1 | 9/2002 | Hoare, II et al. |
| 2002/0184516 A1 | 12/2002 | Hale et al. |
| 2003/0064712 A1 | 4/2003 | Gaston et al. |
| 2003/0217122 A1 | 11/2003 | Roese et al. |
| 2003/0221022 A1 | 11/2003 | Sexton et al. |
| 2003/0224855 A1 | 12/2003 | Cunningham |
| 2004/0002843 A1 | 1/2004 | Robarts et al. |
| 2004/0027258 A1 | 2/2004 | Pechatnikov et al. |
| 2004/0053686 A1 | 3/2004 | Pacey et al. |
| 2004/0095311 A1 | 5/2004 | Tarlton et al. |
| 2004/0158455 A1 | 8/2004 | Spivack et al. |
| 2004/0248632 A1 | 12/2004 | French et al. |
| 2005/0009608 A1 | 1/2005 | Robarts et al. |
| 2005/0091118 A1 | 4/2005 | Fano |
| 2005/0172018 A1 | 8/2005 | Devine et al. |
| 2005/0246275 A1 | 11/2005 | Nelson |
| 2005/0267731 A1 | 12/2005 | Hatcherson et al. |
| 2005/0286421 A1 | 12/2005 | Janacek |
| 2006/0092170 A1 | 5/2006 | Bathiche et al. |
| 2006/0189386 A1 | 8/2006 | Rosenberg |
| 2006/0192852 A1 | 8/2006 | Rosenthal et al. |
| 2006/0223635 A1 | 10/2006 | Rosenberg |
| 2006/0230073 A1 | 10/2006 | Gopalakrishnan |
| 2006/0235674 A1 | 10/2006 | Voigt |
| 2006/0287815 A1 | 12/2006 | Gluck |
| 2006/0293110 A1 | 12/2006 | Mendelsohn |
| 2007/0024644 A1 | 2/2007 | Bailey |
| 2007/0097832 A1 | 5/2007 | Koivisto et al. |
| 2007/0117576 A1 | 5/2007 | Huston |
| 2007/0214449 A1 | 9/2007 | Choi et al. |
| 2007/0223675 A1 | 9/2007 | Surin et al. |
| 2007/0265089 A1 | 11/2007 | Robarts et al. |
| 2007/0299559 A1 | 12/2007 | Janssen et al. |
| 2008/0026838 A1 | 1/2008 | Dunstan et al. |
| 2008/0031234 A1 | 2/2008 | Sbisa et al. |
| 2008/0036653 A1 | 2/2008 | Huston |
| 2008/0070696 A1 | 3/2008 | Kim et al. |
| 2008/0133189 A1 | 6/2008 | Criswell et al. |
| 2008/0146342 A1 | 6/2008 | Harvey et al. |
| 2008/0162498 A1 | 7/2008 | Omoigui |
| 2008/0162707 A1 | 7/2008 | Beck et al. |
| 2008/0177650 A1 | 7/2008 | Jung et al. |
| 2008/0182592 A1 | 7/2008 | Cha et al. |
| 2008/0184138 A1 | 7/2008 | Krzanowski et al. |

(56) References Cited

U.S. PATENT DOCUMENTS

| | | |
|---|---|---|
| 2008/0189360 A1 | 8/2008 | Kiley et al. |
| 2008/0220397 A1 | 9/2008 | Capone et al. |
| 2008/0247636 A1 | 10/2008 | Davis et al. |
| 2008/0261564 A1 | 10/2008 | Logan |
| 2008/0320419 A1 | 12/2008 | Matas et al. |
| 2009/0005018 A1 | 1/2009 | Forstall et al. |
| 2009/0005140 A1 | 1/2009 | Rose et al. |
| 2009/0005167 A1 | 1/2009 | Arrasvuori et al. |
| 2009/0007229 A1 | 1/2009 | Stokes |
| 2009/0024629 A1 | 1/2009 | Miyauchi |
| 2009/0036186 A1 | 2/2009 | Benco et al. |
| 2009/0061901 A1 | 3/2009 | Arrasvuori et al. |
| 2009/0061974 A1 | 3/2009 | Lutnick et al. |
| 2009/0069033 A1 | 3/2009 | Karstens et al. |
| 2009/0089825 A1 | 4/2009 | Coldwell |
| 2009/0102616 A1 | 4/2009 | Stone et al. |
| 2009/0125823 A1 | 5/2009 | Moll et al. |
| 2009/0150802 A1 | 6/2009 | Do et al. |
| 2009/0199302 A1 | 8/2009 | So et al. |
| 2009/0237546 A1 | 9/2009 | Bloebaum et al. |
| 2009/0265257 A1 | 10/2009 | Klinger et al. |
| 2009/0291750 A1 | 11/2009 | Herrmann |
| 2009/0293011 A1 | 11/2009 | Nassar |
| 2009/0304283 A1 | 12/2009 | Predovic et al. |
| 2010/0017820 A1 | 1/2010 | Thevathasan et al. |
| 2010/0050100 A1 | 2/2010 | Dettinger et al. |
| 2010/0125362 A1 | 5/2010 | Canora et al. |
| 2010/0199193 A1 | 8/2010 | Hamilton, II et al. |
| 2010/0217573 A1 | 8/2010 | Hatcherson et al. |
| 2010/0260426 A1 | 10/2010 | Huang |
| 2010/0302143 A1 | 12/2010 | Spivack |
| 2010/0304804 A1 | 12/2010 | Spivack |
| 2010/0331041 A1 | 12/2010 | Liao et al. |
| 2011/0055049 A1 | 3/2011 | Harper et al. |
| 2011/0138317 A1 | 6/2011 | Kang et al. |
| 2011/0184972 A1 | 7/2011 | Ard et al. |
| 2011/0213664 A1 | 9/2011 | Osterhout et al. |
| 2011/0214082 A1 | 9/2011 | Osterhout et al. |
| 2011/0225069 A1 | 9/2011 | Cramer et al. |
| 2011/0310227 A1 | 12/2011 | Konertz et al. |
| 2012/0011142 A1 | 1/2012 | Baheti et al. |
| 2012/0038670 A1 | 2/2012 | Choi et al. |
| 2012/0050324 A1 | 3/2012 | Jeong et al. |
| 2012/0062596 A1 | 3/2012 | Bedi et al. |
| 2012/0095853 A1 | 4/2012 | Von Bose et al. |
| 2012/0143361 A1 | 6/2012 | Kurabayashi et al. |
| 2012/0174062 A1 | 7/2012 | Choi et al. |
| 2012/0230538 A1 | 9/2012 | Calman et al. |
| 2012/0239469 A1 | 9/2012 | Steinberg et al. |
| 2012/0249586 A1 | 10/2012 | Wither et al. |
| 2012/0253825 A1 | 10/2012 | Di Fabbrizio et al. |
| 2012/0323938 A1 | 12/2012 | Skeen et al. |
| 2012/0326966 A1 | 12/2012 | Rauber |
| 2013/0030903 A1 | 1/2013 | Spivack |
| 2013/0033522 A1 | 2/2013 | Calman et al. |
| 2013/0042296 A1 | 2/2013 | Hastings et al. |
| 2013/0050258 A1 | 2/2013 | Liu et al. |
| 2013/0147836 A1* | 6/2013 | Small ................. G06F 3/013 |
| | | 345/633 |
| 2013/0147837 A1 | 6/2013 | Stroila |
| 2013/0155105 A1 | 6/2013 | Boldyrev et al. |
| 2013/0174268 A1 | 7/2013 | Wang et al. |
| 2013/0179303 A1 | 7/2013 | Petrou et al. |
| 2013/0239019 A1 | 9/2013 | Pike et al. |
| 2013/0293580 A1 | 11/2013 | Spivack |
| 2013/0297460 A1 | 11/2013 | Spivack |
| 2014/0009494 A1* | 1/2014 | Kasahara ........... G06K 9/00671 |
| | | 345/633 |
| 2014/0222558 A1 | 8/2014 | Spivack |
| 2014/0306866 A1 | 10/2014 | Miller et al. |
| 2015/0015459 A1 | 1/2015 | Cho et al. |
| 2015/0302517 A1 | 10/2015 | Spivack |
| 2015/0350223 A1 | 12/2015 | Spivack |
| 2015/0367233 A1 | 12/2015 | Hicks et al. |
| 2016/0071326 A1 | 3/2016 | Spivack |
| 2016/0299569 A1 | 10/2016 | Fisher et al. |
| 2019/0102946 A1* | 4/2019 | Spivack ................. G06F 3/017 |

FOREIGN PATENT DOCUMENTS

| | | |
|---|---|---|
| WO | 2006/024866 A1 | 3/2006 |
| WO | 2009/002879 A1 | 12/2008 |

OTHER PUBLICATIONS

Written Opinion PCT/US2010/035282 dated Feb. 1, 2011; pp. 1-6.
"Object-Oriented Programming," as shown in http://en.wikipedia.org/wiki/Object-oriented_programming, dated Apr. 22, 2009, last accessed Nov. 4, 2013; pp. 1-9.
Hughes, N., "Apple Envisions Interactive, Augmented Reality iPhone Multiplayer Games," http://appleinsider.com/articles/10/11/2014, Nov. 4, 2010, 6 pages.
Kaiser, E. Mutual disambiguation of 3 D multimodal interaction in augmented and virtual reality, Proceedings of the 5th international conference on multimodal interfaces (ICMI'03: Fifth International Conference on Multimodal Interfaces), pp. 12-19.

* cited by examiner

SYSTEM AND METHOD FOR SELECTING TARGETS IN AN AUGMENTED REALITY ENVIRONMENT

CROSS-REFERENCE TO RELATED APPLICATIONS(S)

This application is a continuation application of prior application Ser. No. 16/543,011, filed on Aug. 16, 2019, which is a continuation application of prior application Ser. No. 14/939,889, filed on Nov. 12, 2015, which has issued as U.S. Pat. No. 10,388,070 on Aug. 20, 2019, which is continuation of prior application Ser. No. 13/874,421, filed on Apr. 30, 2013, which was based on and claimed priority under 35 U.S.C. § 119(e) of a U.S. Provisional application Ser. No. 61/640,856, filed on May 1, 2012, in the U.S. Patent and Trademark Office, the disclosure of which is incorporated by reference herein in its entirety.

BACKGROUND

Miniaturization of consumer electronics with sophisticated graphics capabilities and expansive computing power has augmented the activities one can engage in via consumer electronics and in particular, portable electronics such as smart phones, tablets, and the like. The advancements in technologies also have brought science fiction into reality.

Further, portable electronics or other electronics devices now generally include a large variety of sensing capabilities. These capabilities can be utilized to further enhance the users' augmented reality experiences.

BRIEF DESCRIPTION OF THE DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
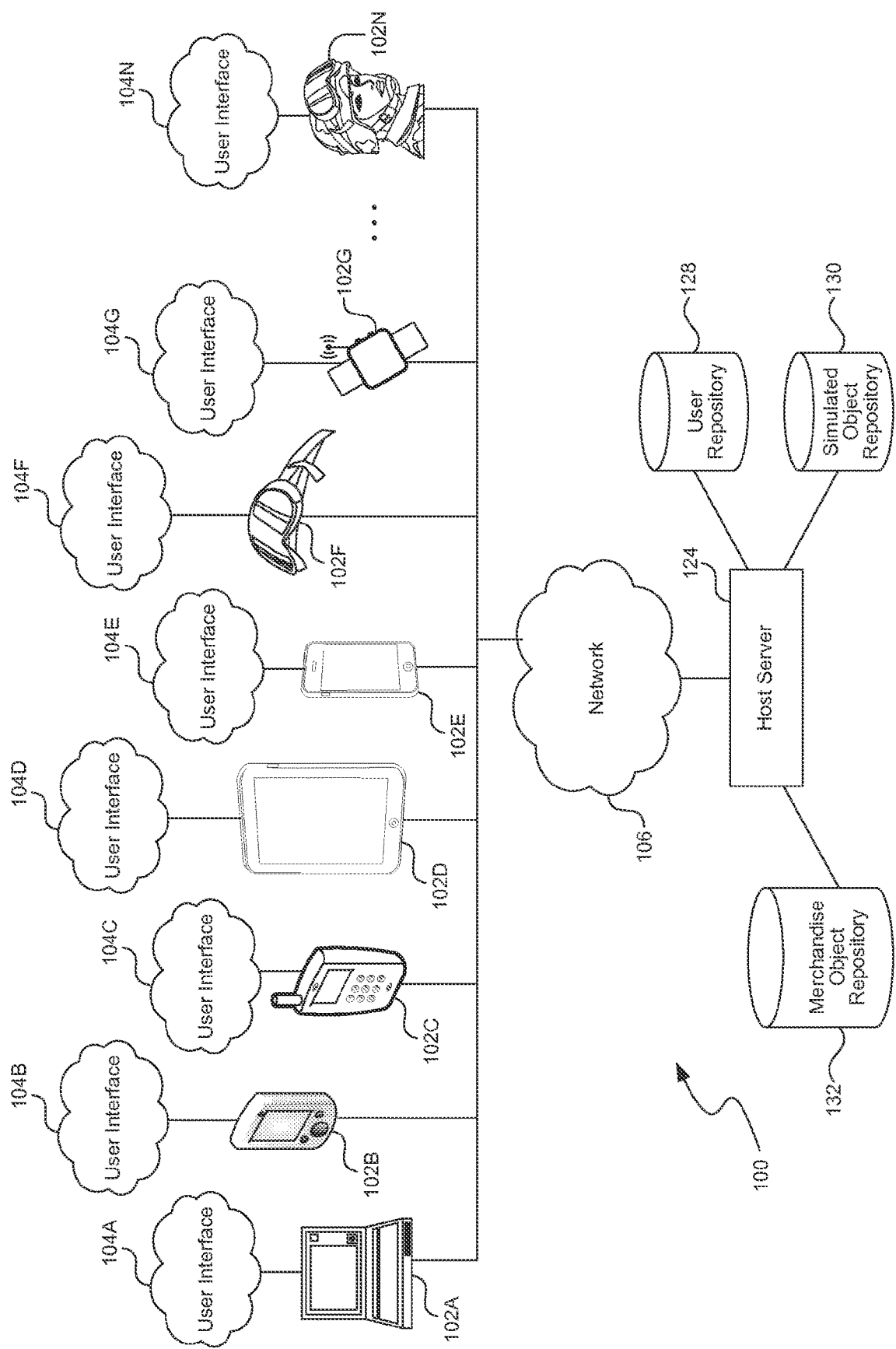
FIG. 1 illustrates an example block diagram of mobile devices able to communicate with a host server that generates and controls access to simulated objects and/or facilitates transactions of a physical product or real life service via an augmented reality environment (e.g., an augmented reality marketplace) through a network.

Techniques are disclosed for facilitating electronic commerce in an augmented reality environment. In some embodiments, a method comprises detecting, by a mobile device, presence of the physical product or the real life service; and presenting, on the mobile device, information to conduct the transaction of a physical product or a real life service via an augmented reality environment. The mobile device facilitates the augmented reality environment. In some embodiments, a method comprises detecting one or more targets in the augmented reality platform using a select area in a perspective of a user, the perspective being captured by a mobile device; and prompting the user to choose an object of interest from the one or more detected targets. Among other advantages, embodiments disclosed herein provide an intuitive and integrated user experience in shopping using augmented reality devices, thereby reducing the consumer user's effort in conducting such activities, reducing necessary sales personnel and their working hours, and increasing sales.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Mobile devices, especially the wearable ones which may be in forms of eyewear, mobile-enabled wrist watches, head-mounted displays, are now available to provide augmented reality experiences to users. Embodiments of the present disclosure include systems and methods for facilitating transactions of a physical product or real life service via an augmented reality environment. Additionally, embodiments of the present disclosure include systems and methods for enabling selection of a physical product or a real life service in an augmented reality platform via a mobile device.

FIG. 1 is a block diagram of an example system 100 including mobile devices 102A-N able in communication with a host server 124 that generates and controls access to simulated objects and/or facilitates transactions of a physical product or real life service via an augmented reality environment through a network 106.

The mobile devices 102A-N can be any system and/or device, and/or any combination of devices/systems that is able to establish a connection with another device, a server and/or other systems. The mobile devices 102A-N typically include a display and/or other output functionalities to present information and data exchanged between/among the devices 102A-N and the host server 124. For example, the mobile devices 102A-N can be any of, but are not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, an iPhone, cover headsets, heads-up displays, helmet mounted display, head-mounted display, scanned-beam display, wearable computer such as mobile enabled watches, and/or any other mobile interfaces and viewing devices, etc. Additional examples of mobile devices 102A-N can include a Google Glass, smart glasses/goggles, a smart phone, or other suitable mobile computing devices that are configured to facilitate or enable an augmented reality environment or platform. The mobile devices 102A-N may be location-aware devices that are able to determine their own location or identify location information from an external source. In one embodiment, the mobile devices 102A-N are coupled to a network 106. In some embodiments, the devices 102A-N and host server 124 may be directly connected to one another.

In one embodiment, the host server 124 is operable to provide simulated objects (e.g., objects, computer-controlled objects, or simulated objects) that correspond to real world physical locations to be presented to users on mobile devices 102A-N. The simulated objects are typically software entities or occurrences that are controlled by computer programs and can be generated upon request when certain criteria are met. The host server 124 also processes interactions of simulated object with one another and actions on simulated objects caused by stimulus from a real user and/or the real world environment.

In some embodiments, the host server 124 is operable, in conjunction with the mobile devices 102A-N, to facilitate electronic commercial transactions in an augmented reality environment or platform, such as an augmented reality marketplace. Services and functions provided by the host server 124 and the components therein are described in detail with further references to the examples of FIG. 3A-3B.

The mobile devices 102A-N are generally operable to provide access (e.g., visible access, audible access) to the simulated objects to users, for example via user interface 104A-N displayed on the display units. The devices 102A-N may be able to detect simulated objects based on location and/or timing data and provide those objects authorized by the user for access via the devices. In some embodiments, the mobile devices 102A-N can facilitate electronic commercial transactions in an augmented reality environment. In some embodiments, the devices 102A-N communicate with the host server 124 in facilitating the transactions. Services and functions provided by the mobile devices 102A-N and the components therein are described in detail with further references to the examples of FIG. 4A-4B.

The network 106, over which the mobile devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the mobile devices 102A-N and the host server 124 and may appear as one or more networks to the serviced systems and devices. In one embodiment, communications to and from the mobile devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G (e.g., WCDMA/UTMS based 3G networks), 3.5G, 4G, !MT- Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSPA, HSPA+, UMTS-TDD, lxRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 124 may include or be coupled to a user repository 128 and/or a simulated object repository 130 and or a merchandise object repository 132. The data repositories 128, 130, 132 can store software, descriptive data, images, system information, drivers, and/or any other data item utilized by other components of the host server 124 and/or any other servers for operation. The data repositories 128, 130, 132 may be managed by a database management system (DBMS), for example but not limited to, Oracle, DB2, Microsoft Access, Microsoft SQL Server, PostgreSQL, MySQL, FileMaker, etc.

The repositories 128, 130, 132 can be implemented via object-oriented technology and/or via text files, and can be managed by a distributed database management system, an object-oriented database management system (OODBMS) (e.g., ConceptBase, FastDB Main Memory Database Management System, JDOinstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 124 is able to provide data to be stored in the user data repository 128, the simulated object repository 130, the merchandise object repository 132, and/or the can retrieve data stored in the user data repository 128 and/or the simulated object repository 130 and/or the merchandise object repository 132.

The user data repository 128 can store user information, user preferences, user profile, user list of interest, user favorite, user bookmark, user annotation, user tags, access permissions associated with the users, device information, hardware information, etc. The simulated object repository 130 can store software entities (e.g., computer programs) that control simulated objects and the simulated environments in which they are presented for visual/audible access or control/manipulation.

The simulated object repository 130 may further include simulated objects and their associated data structures with metadata defining the simulated object including its associated access permission.

The merchandise object repository 132 can store merchandise information including, for example, merchandise name, alias, attributes, shape, size, dimension, or other physical characteristics or recognition patterns or augmented reality markers, location (if suitable), vendor(s), price, SKU code, QR code, I-dimensional or 2-dimensional or multi-dimensional barcode, RFID code, metadata, tags, annotations, sales contact information.

Figure 2:
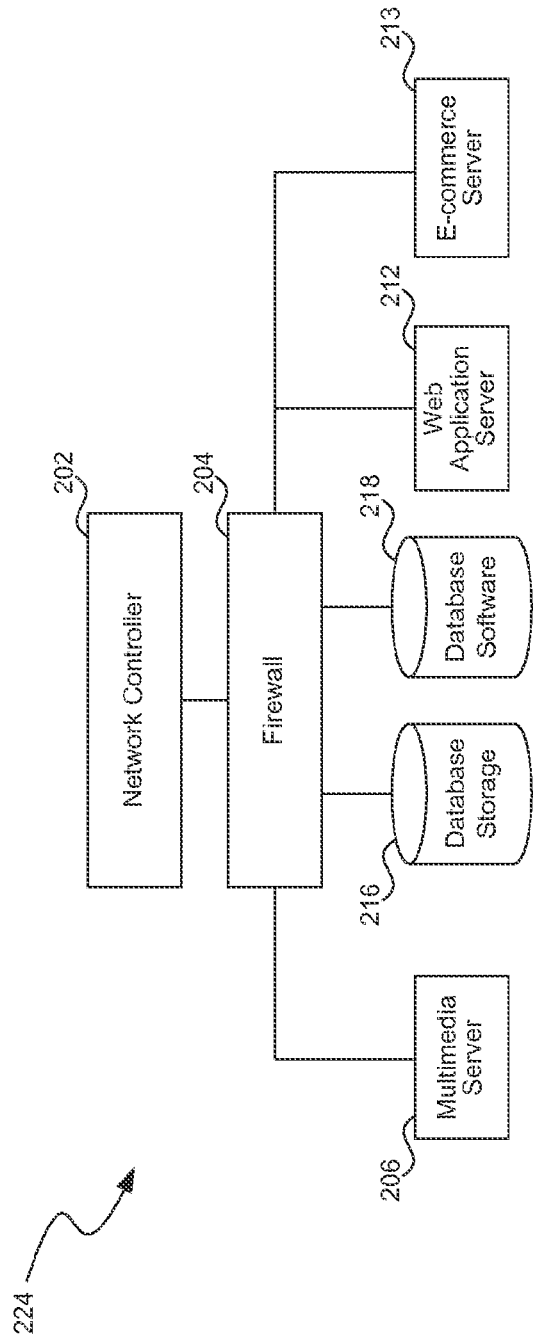
FIG. 2 depicts an example block diagram of the components of a host server that generates information that facilitates transactions of a physical product or real life service via an augmented reality environment.

FIG. 2 depicts an example block diagram of the components of a host server 224 that generates information that facilitates transactions of a physical product or real life service via an augmented reality environment.

In the example of FIG. 2, the host server 224 includes a network controller 202, a firewall 204, a multimedia server 206, a web application server 212, an electronic commerce (e-commerce) server 213, and a database including a database storage 216 and database software 218.

In the example of FIG. 2, the network controller 202 can be a networking device that enables the host server 224 to mediate data in a network with an entity that is external to the host server 224, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The firewall 204, can, in some embodiments, govern and/or manage permission to access/proxy data in a computer network, and track varying levels of trust between different machines and/or applications. The firewall 204 can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall 204 may additionally manage and/or have access to an access control list which details permissions including for example, the access and operation rights of an object by an individual, a machine, and/or an application, and the circumstances under which the permission rights stand.

Other network security functions can be performed or included in the functions of the firewall 204, can be, for example, but are not limited to, intrusion-prevention, intrusion detection, next-generation firewall, personal firewall, etc. without deviating from the novel art of this disclosure. In some embodiments, the functionalities of the network controller 202 and the firewall 204 are partially or wholly combined and the functions of which can be implemented in any combination of software and/or hardware, in part or in whole.

In the example of FIG. 2, the host server 224 includes the multimedia server 206 or a combination of multimedia servers to manage images, photographs, animation, video, audio content, graphical content, documents, and/or other types of multimedia data for use in or to supplement simulated content such as simulated objects and their associated deployment environment (e.g., a simulated environment). The multimedia server 206 is any software suitable for delivering messages to facilitate retrieval/transmission of multimedia data among servers to be provided to other components and/or systems of the host server 224, for example when rendering a web page, an augmented reality environment, and/or augmenting physical objects using multimedia content (e.g., the augmented information includes a short video clip introducing physical products or real life services).

In addition, the multimedia server 206 can facilitate transmission/receipt of streaming data such as streaming images, audio, and/or video. The multimedia server 206 can be configured separately or together with the web application server 212, depending on a desired scalability of the host server 224. Examples of graphics file formats that can be managed by the multimedia server 206 include but are not limited to, ADRG, ADRI, AI, GIF, IMA, GS, JPG, JP2, PNG, PSD, PSP, TIFF, and/or BMP, etc.

The web application server 212 can include any combination of software agents and/or hardware modules for accepting Hypertext Transfer Protocol (HTTP) requests from end users, external systems, and/or external mobile devices and responding to the request by providing the requestors with web pages, such as HTML documents and objects that can include static and/or dynamic content (e.g., via one or more supported interfaces, such as the Common Gateway Interface (CGI), Simple CGI (SCGI), PHP, JavaServer Pages (JSP), Active Server Pages (ASP), ASP.NET, etc.). In addition, a secure connection, SSL and/or TLS can be established by the web application server 212.

The e-commerce server 213 can include any combination of software agents and/or hardware modules for facilitating electronic commercial transactions to be initiated, processed, and completed with mobile devices (e.g., devices 102A-N, FIG. 1). The e-commerce server 213 typically includes at least one processor and a memory, and may be further connected to one or more computers (not shown in FIG. 2 for simplicity) that manage inventory, logistics and/or other commercial functions. In some embodiments, the e-commerce server 213 can establish secured connections using one or more well-known security protocols.

Figure 5A:
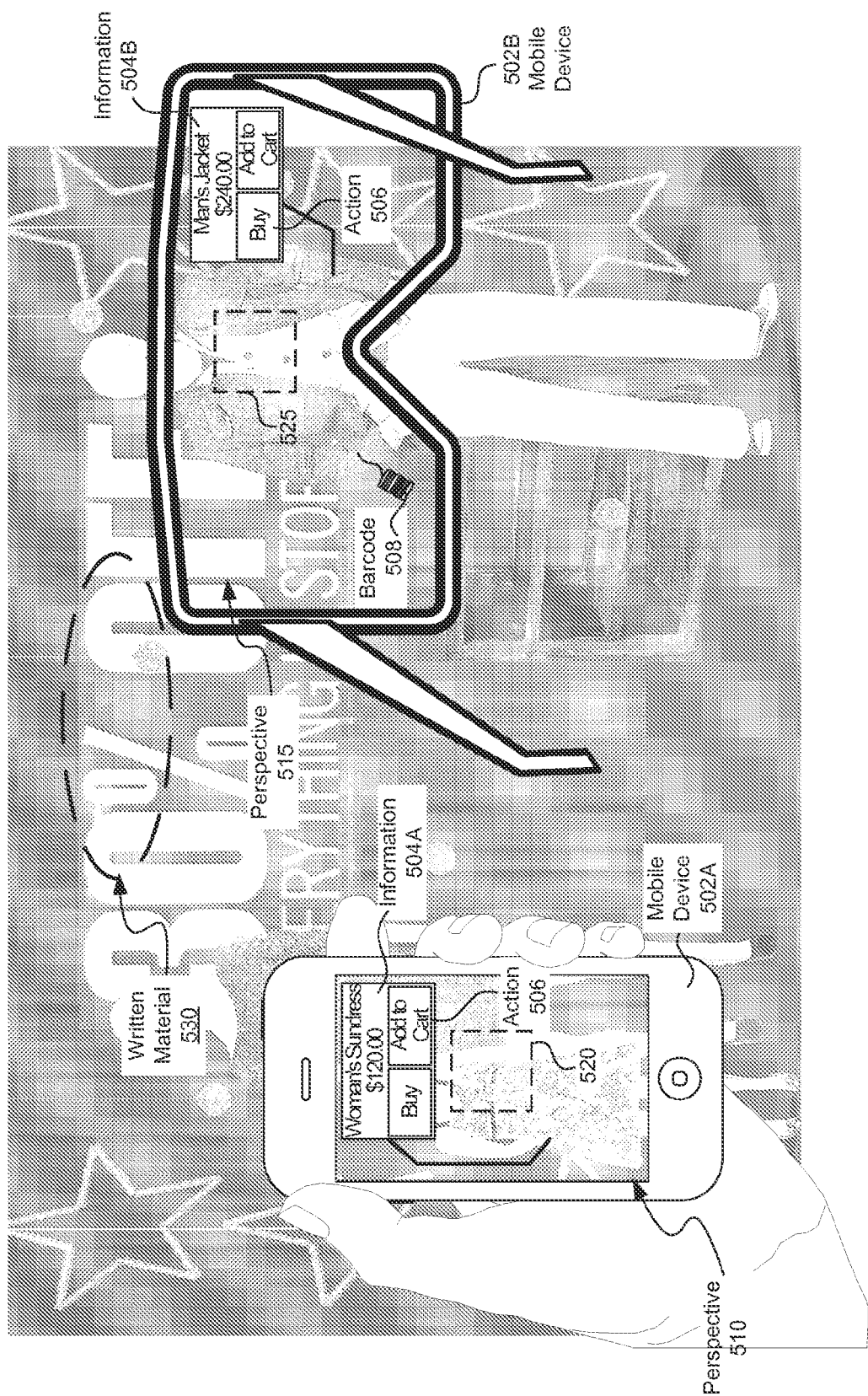
FIG. 5A illustrates an example application where mobile devices such as a smart phone or a smart goggle having perspective interfaces which are used to facilitate electronic commerce in an augmented reality marketplace.
Figure 5B:
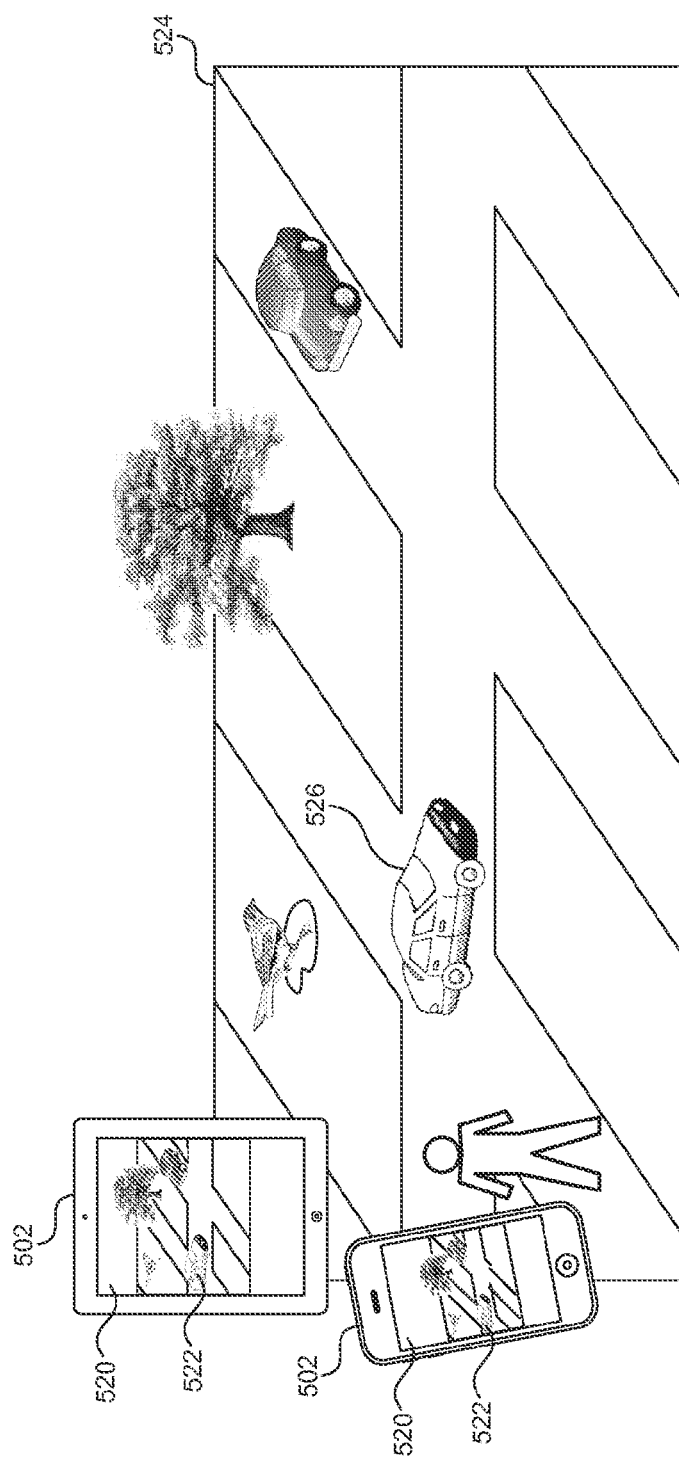
FIG. 5B illustrates an example screenshot on a mobile device displaying an augmented reality environment with objects associated with physical objects and/or real life services in a real world environment.

In general, the host server 224 assists, by interactively or proactively providing relevant information, mobile devices such as device 102A-N to generate the augmented reality user interfaces, which facilitate the augmented reality marketplace disclosed herein, as shown in the example screenshots of FIG. 5B-FIG. 5C. The augmented information, which is provided by the host server 224 to client users/end devices (e.g., onto the user interface screens 104A-104N on mobile devices 102A-102N for display). In some embodiments, the web application server 212 and/or thee-commerce server 213 also perform authentication processes before responding to requests for conducting transactions in the augmented reality marketplace.

The databases 216, 218 can store software, descriptive data, images, system information, drivers, and/or any other data item utilized by other components of the host server for operation. The databases 216, 218 may be managed by a database management system (DBMS), for example but not limited to, Oracle, DB2, Microsoft Access, Microsoft SQL Server, PostgreSQL, MySQL, FileMaker, etc. The databases 216,218 can be implemented via object-oriented technology and/or via text files, and can be managed by a distributed database management system, an object-oriented database management system (OODBMS) (e.g., ConceptBase, FastDB Main Memory Database Management System, JDOinstruments, ObjectDB, etc.), an object-relational database management system (ORDBMS) (e.g., Informix, OpenLink Virtuoso, VMDS, etc.), a file system, and/or any other convenient or known database management package.

In the example of FIG. 2, the host server 224 includes components (e.g., a network controller, a firewall, a storage server, a multimedia server, an e-commerce server, and/or a database including a database storage and database software, etc.) coupled to one another and each component is illustrated as being individual and distinct. However, in some embodiments, some or all of the components, and/or the functions represented by each of the components can be combined in any convenient or known manner. Furthermore, the functions represented by the devices can be implemented individually or in any combination thereof, in hardware, software, or a combination of hardware and software.

Figure 3A:
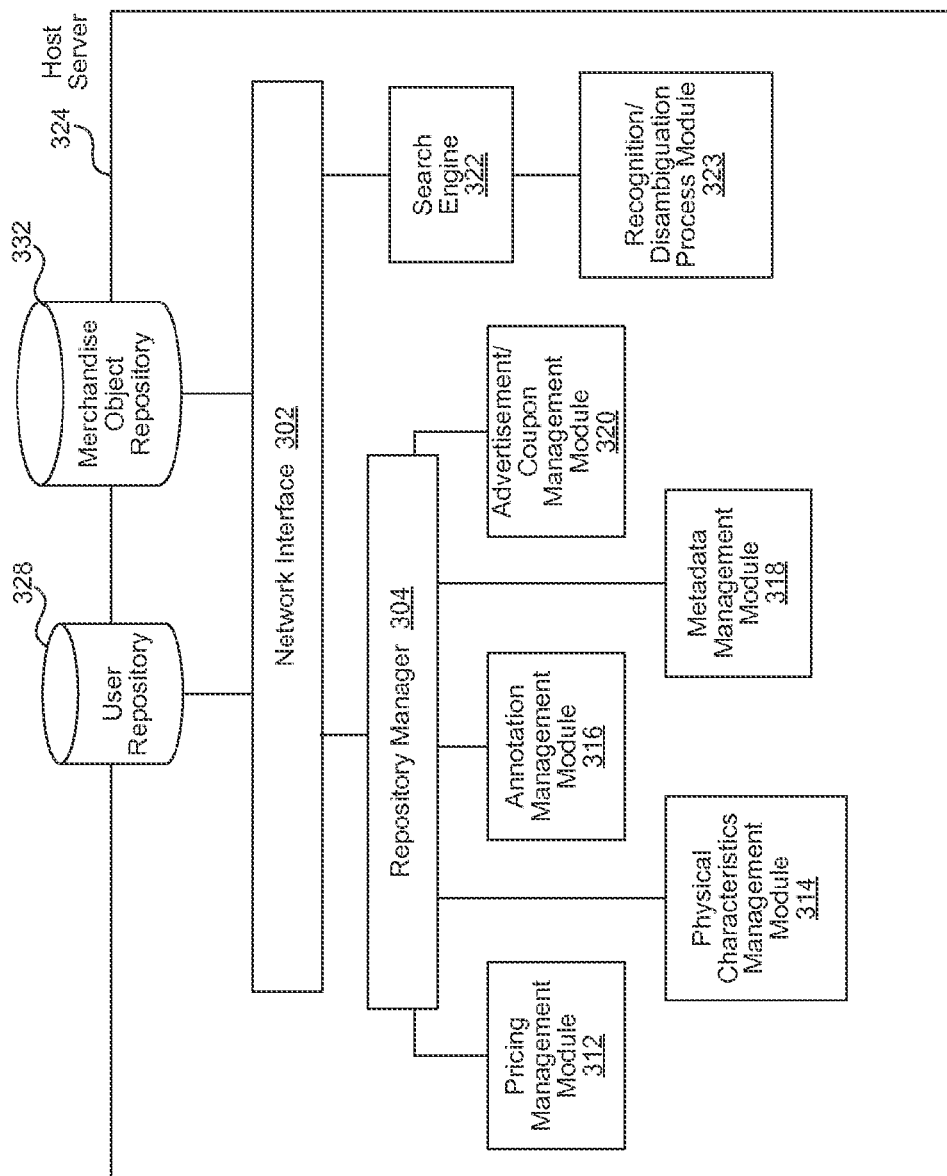
FIG. 3A depicts an example functional block diagram of the host server that facilitates transactions of a physical product or real life service via an augmented reality environment.

FIG. 3A depicts an example functional block diagram of the host server 324 that facilitates transactions of a physical product or real life service via an augmented reality environment.

The host server 324 includes a network interface 302, a repository manager 304, and/or a search engine 322. The host server 324 is also coupled to a user data repository 328 and/or a merchandise object repository 332. The user data repository 328 and merchandise object repository 332 are described with further reference to the example of FIG. 1. The host server 324 can also include a variety of modules including, for example, a pricing management module 312, a physical characteristics management module 314, an annotation management module 316, a metadata management module 318, an advertisement/coupon management module 320, and/or a recognition/disambiguation process module 323. The management modules 312,314, 316,318, and 320 can be coupled to the repository manager 304. The recognition/disambiguation process module 323 can be coupled to the search engine 322.

Additional or less modules can be included without deviating from the techniques discussed in this disclosure. In addition, each module in the example of FIG. 3A can include any number and combination of sub-modules, and systems, implemented with any combination of hardware and/or software modules.

The host server 324, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 3A, the network interface 302 can be a networking device that enables the host server 324 to mediate data in a network with an entity that is external to the host server, through any known and/or convenient communications protocol supported by the host and the external entity. The network interface 302 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The merchandise object repository 332 can be a database that comprises any combination of software agents and/or hardware modules able to store, modify, update, adjust, edit, and/or delete various physical as well as other attributes of a merchandise object (e.g., a physical product, or a real life service). The management functions of these physical and other attributes of merchandise objects can be performed by the repository manager 304.

A merchandise object can include a physical entity or goods (such as a store, a merchant, commercial product, a living object, an inanimate object, etc.) or a real life service (such as a restaurant, a spa, a beauty salon, a medical doctor, an art performance, etc.). In some embodiments, merchandise objects can be identified/recognized/detected using the various physical and/or other characteristics of the objects, and information relevant to commercial transactions of the physical product or real life service can be presented/displayed/projected in the augmented reality environment so as to enable the user to conduct such transactions.

Characteristics and attributes of merchandise objects that help the identification/recognition/detection can include what can be perceived by users in the augmented reality via a physical device (e.g., a mobile device or device 102 in the example of FIG. 1). For example, they can include merchandise name, alias, attributes, shape, size, dimension, or other physical characteristics or recognition patterns or augmented reality markers, or location (if suitable). They can also include other identification information that can be detected by the device 102, such as vendor(s) name, SKU code, QR code, I-dimensional or 2-dimensional or multi-dimensional barcode, RFID code.

One embodiment of the host server 324 includes a search engine 322. The search engine 322 can be any combination of software agents and/or hardware modules able to search, detect, and/or identify merchandise objects.

More specifically, attributes/clues/characteristics observed by the mobile device can be sent to the search engine 322. The search engine 322 can perform textual or imagery or other suitable types of search to identify the merchandise object. The search engine 322 can search or detect objects either automatically or in response to user request. For example, the user can request access to merchandise objects' information by perform a search request. The search request parameters can include, one or more of, at least a partial name input of the merchandise object from the user, the user's location, the current time or a time period. The search that is performed can automatically detect the merchandise object(s) being viewing by or otherwise available for access to the user in the augmented reality. In one embodiment, the merchandise objects are further filtered based on preferences or profiles or interest of the user.

The search engine 322 can further utilize the recognition/disambiguation process module 323 to prompt the user to assist in disambiguation of the merchandise object. For example, the module 323 can generate a plurality of choices in forms of name, picture, locational information, and/or description that can help the recognition. For another example, the module 323 can prompt the user to enter a partial or a full name. For yet another example, the module 323 can ask the user to take a plurality of pictures of the merchandise object.

Once identified or detected the presence of the merchandise object or product, the host server 324 can access relevant information including, for example, purchase information of the product, price from the vendor of the exact product that the user is viewing in the augmented reality, price from another vendor of the same or similar product, availability of the product, any metadata or tags of the product, annotations or reviews of the product added by another user of the augmented reality environment, images or video clips that are shared by other users or the merchant, and/or sales contact information. These information can be generated, maintained and updated using the modules 312-320 coupled to the repository manager 304 (e.g., by the merchant, by the user, by another user, or by an administrator of the host server 324).

In some embodiments, the merchandise object is stored in the merchandise object repository 332 using a data structure having metadata. The metadata can properties of the simulated object, location and/or timing parameters (e.g., sale event, availability, store hours, etc.) The location data can be specified with longitude and latitude coordinates, GPS coordinates, and/or relative position. In one embodiment, the object is associated with a unique identifier or augmented reality (AR) markers. The unique identifier or markers may be further associated with a location data structure having a set of location data that includes the qualifying location data for the merchandise object. In one embodiment, the metadata includes a link to data from an external source (e.g., the store's or merchant's website on the Internet).

In one embodiment, this information is automatically provided to the user when he or she arrives at or near the merchandise object's location (e.g., implicit request) via the device. Alternatively, the information is provided upon request by the user (e.g., explicit request). For example, merchandise objects associated with various attractions, for example, in a shopping mall or a tourist location in the real world, can be selected by the user (e.g., via input to the device).

Additionally, an advertisement (e.g., an electronic advertisement) that is relevant to the merchandise object is delivered by the advertisement/coupon management module 320 to the user that qualifies one or more criteria. The user may qualify on a basis of a location, identity, and/or a timing parameter. For example, the user may be provided with advertisements of local pizza shops or other late night dining options when the user is driving around town during late night hours when other dining options may not be available. In another example, an electronic coupon can be presented to a user using the device based on the merchandise object identification result, for example, when the device is located at the location during a certain period of time that satisfies the criteria. The electronic coupon may be redeemed by the user for conducting transactions of the physical product or the real life service.

Figure 3B:
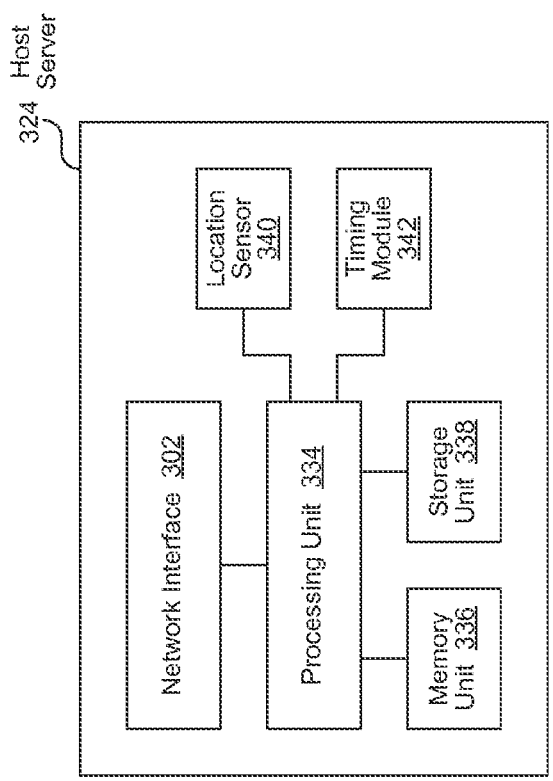
FIG. 3B depicts an example block diagram illustrating the components of the host server that facilitates transactions of a physical product or real life service via an augmented reality environment.

FIG. 3B depicts an example block diagram illustrating the components of the host server 324 that facilitates transactions of a physical product or real life service via an augmented reality environment.

In one embodiment, host server 334 includes a network interface 302, a processing unit 334, a memory unit 336, a storage unit 338, a location sensor 340, and/or a timing module 342. Additional or less units or modules may be included. The host server 324 can be any combination of hardware components and/or software agents for generating information for merchandise objects in facilitating transactions in an augmented reality marketplace environment. The network interface 302 has been described in the example of FIG. 3A.

One embodiment of the host server 324 further includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 334 can be processed by the processing unit 334 and output to a display and/or output via a wired or wireless connection to an external device, such as a mobile phone, a portable device, a host or server computer by way of a communications component.

One embodiment of the host server 324 further includes a memory unit 336 and a storage unit 338. The memory unit 335 and a storage unit 338 are, in some embodiments, coupled to the processing unit 334. The memory unit can include volatile and/or non-volatile memory. In receiving characteristics of and generating relevant information for the merchandise objects, the processing unit 334 may perform one or more processes related to identifying/recognizing/detecting the merchandise objects and/or generating information for conducting transactions of such objects.

In some embodiments, any portion of or all of the functions described of the various example modules in the host server 324 of the example of FIG. 3A can be performed by the processing unit 334.

Figure 4A:
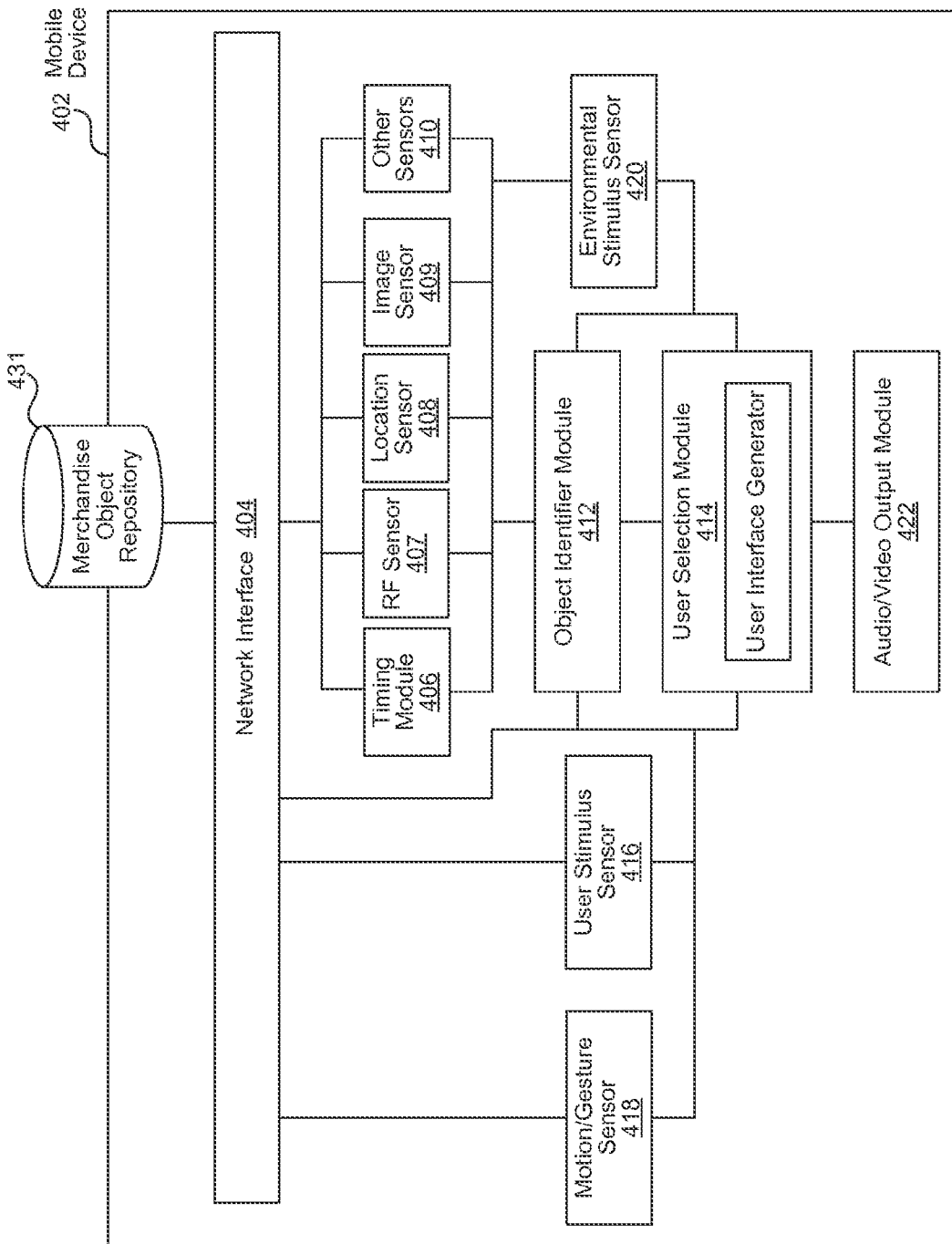
FIG. 4A depicts an example functional block diagram of a mobile device that presents augmented information with merchandise objects to a user and processes interactions with the objects in the augmented reality marketplace based on the information.

FIG. 4A depicts an example functional block diagram of a mobile device 402 that presents augmented information with merchandise objects to a user and processes interactions with the objects in the augmented reality marketplace.

The mobile device 402 includes a network interface 404, a timing module 406, an RF sensor 407, a location sensor 408, an image sensor 409, an object identifier module 412, a user selection module 414, a user stimulus sensor 416, a motion/gesture sensor 418, an environmental stimulus sensor 420, an audio/video output module 422, and/or other sensors 410. The mobile device 402 may be any electronic device such as the devices described in conjunction with the mobile devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, Google Glass, smart glasses/goggles, wearable computer such as mobile enabled watches or eyewear, and/or any other mobile interfaces and viewing devices, etc.

In one embodiment, the mobile device 402 is coupled to a merchandise object repository 431 for identifying/detecting/recognizing merchandise objects (e.g., physical product or real life service) in the augmented reality environment. The merchandise object repository 431 may be internal to or coupled to the mobile device 402 but the contents stored therein can be illustrated with reference to the example of a merchandise object repository 132 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The mobile device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the mobile device 402 to mediate data in a network with an entity that is external to the host server, through any known and/or convenient communications protocol supported by the host and the external entity. The network interface 404 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

According to the embodiments disclosed herein, the mobile device 402 can facilitate transactions (e.g., e-commerce transactions) of a merchandise object (e.g., a physical product or a real life service) via an augmented reality environment provided by the mobile device 402. The mobile device 402 can detect presence of the physical product or the real life service when the product or service is seen/viewed/looked at by the user or in vicinity of the user. In some embodiments, the mobile device 402 automatically identifies the product or service from a perspective of a user. The perspective can be captured or sensed by the mobile device 402 via, for example, a camera or an image sensor.

After detecting/identifying/recognizing the merchandise object, the mobile device 402 can access information relevant to the transaction of the merchandise object(s) from a merchandise object repository (e.g., repository 431 in mobile device 402 and/or repository 332 in host server 324), and can present the relevant information to the user to conduct the transaction of the product or service via the augmented reality environment. For example, the mobile device 402 can render on a display of the device 402

More specifically, one embodiment of the mobile device 402 includes a timing module 406. The timing module 406 can be any combination of software agents and/or hardware modules able to identify, detect, transmit, compute, a current time, a time range, and/or a relative time of a request related to simulated objects/environments.

The timing module 406 can include a local clock, timer, or a connection to a remote time server to determine time. The timing module 406 can be implemented via any known and/or convenient manner including but not limited to, electronic oscillator, clock oscillator, or various types of crystal oscillators. According to some embodiments, the timing module 406 can provide time data which may be used to assist identification, recognition or detection by the mobile device 402 of the merchandise object. Examples that the mobile device 402 can consider include the time of day of a request, the date of the request, a relative time to another event, the time of year of the request, and/or the time span of a request or activity pertaining to merchandise objects.

One embodiment of the mobile device 402 includes a radio frequency (RF) or other types of wireless sensor 407. The RF sensor 407 can be any combination of software agents and/or hardware modules able to detect or identify an RF identification chip or other similar wireless identification tags.

One embodiment of the mobile device 402 includes a location sensor 408. The location sensor 408 can be any combination of software agents and/or hardware modules able to identify, detect, transmit, compute, a current location, a previous location, a range of locations, a location at or in a certain time period, and/or a relative location of the mobile device 402. The location sensor 408 can include a local sensor (e.g., GPS sensor) or a connection to an external entity (e.g., a base station) to determine the location information. The location sensor 408 can determine location or relative location of the mobile device 402 via any known or convenient manner including but not limited to, GPS, cell phone tower triangulation, mesh network triangulation, relative distance from another location or device, RF signals, RF fields, optical range finders or grids, etc. The location sensor 408 can identify location data and determine whether the location data satisfies the location parameter of a certain criteria. In some embodiments, the location sensor 408 provides location data to the host server (e.g., host server 324 of FIG. 3A) for the host server to determine whether the criteria is satisfied.

One embodiment of the mobile device 402 includes a camera or an image sensor 409. The image sensor 409 can be any combination of software agents and/or hardware modules able to record or capture still images such as photographs or moving images such as video clips or movies.

It is noted that a person having ordinary skills in the art will understand that sensor modules 407-409 are exemplary, as the mobile device 402 can include other sensors 410 including, for example, accelerometers, gyroscopic gauges, proximity sensors, light sensors, microphones, temperature sensors, heart beat sensors, touch sensitive sensors including touch-screens, fingerprint sensors, and so forth.

The mobile device 402 utilizes suitable sensors to detect presence of the physical product or the real life service in the augmented reality environment or platform. In some embodiments, the mobile device automatically identifies or detects the product(s) or service(s) that falls within a perspective of the user, that is, being viewed/looked at/seen by the user. The product is recognized/identified/detected by using one of several mechanisms as employed by the object identifier module 412, and by querying the merchandise object repository 431.

More specifically, mobile device 402 includes the object identifier module 412. The object identifier module 412 can be any combination of software agents and/or hardware modules able to identify, detect, and/or recognize, merchandise objects for presentation to a user. The object identifier module 412, in one embodiment, is coupled to the timing module 406, the RF sensor 407, the location sensor 408, the image sensor 409, and/or other sensors 410. The identifier module 412 can also receive data signals from the motion/gesture sensor 418, the user stimulus sensor 416, the environmental stimulus sensor 420, and is coupled to the merchandise object repository 431 via the network interface 404. The object identifier module 412 is operable to identify the merchandise objects available for access using the device 402.

In some embodiments, the presence of the product is detected or identified in the augmented reality environment by a shape or other physical characteristics for presentation via the mobile device to facilitate transactions. For example, the product or service can have an unique combination of shape, size, color, or other physical dimension or characteristics (as registered in the merchandise object repository 431) so that the object identifier module 412 can recognize it. Such shape or physical characteristics can be detected from, for example, the image sensor 409. As previously mentioned, the entries in the repository 431 can also include recognition patterns or photos or videos or metadata that may help identifying the product.

In some embodiments, the presence of the product or service is detected or identified in the augmented reality environment by a geographic location of the product or service. For example, the location of the mobile device 402 can assist in identifying (e.g., by pinpointing or ruling out) certain product or service that is only available in that location. Such location data can be detected from, for example, the location sensor 408.

In some embodiments, the presence of the product is detected or identified in the augmented reality environment by one or more of: (i) a visual marker; (ii) a marker or tag; (iii) a one-dimensional barcode; or (iv) a multi-dimensional barcode, on the product. For example, a marker on the object such as a QR code or other augmented reality marker can be presented for identification or detection (e.g., via the image sensor 409). In another example, a barcode representing a stock-keeping unit number (SKU) may be present. The barcode can be one-dimensional or multi-dimensional.

In some embodiments, the presence of the product is detected or identified in the augmented reality environment by a radio frequency identification (RFID) chip coupled to the product. For example, the RFID chip can be embedded in the product, or on a label attached to the product, or attached on a surface or a nearby location of the product. The RFID chip can be detected and read, for example, via the RF sensor/RFID reader 407.

In some embodiments, the presence of the product is detected or identified in the augmented reality environment by optical character recognition (OCR) of written materials on or nearby the product. For example, the image sensor 409 can capture text on labels or other marketing materials on or near the product, and the object identifier module 412 can use well-known OCR techniques to convert the written materials into text for identification (e.g., via a search using the search engine 322 to search merchandise repositories 332, 431).

Further, as an additional or an alternative embodiment, the object identifier module 412 can receive input from the user to disambiguate an identity of the product or service. For example, the user's input can include at least partially a name of the product or service. The user can be prompted to name the product in assisting the disambiguation process proactively or interactively. Such user input can be received from, for example, the motion/gesture sensor 418 or the user stimulus sensor 416.

Some embodiments of the object identifier module 412 can also receive advisory data associated with the product or service to assist the identifying/recognizing/detecting the product or service. The advisory data being added by another user of the augmented reality environment, or by an administrator or merchant of the augmented reality marketplace. The advisory data can include one or more of: (i) metadata or tags relevant to the product or service, or (ii) an annotation that is descriptive of the product or service. The metadata about the product can be added by another previous user who already identified the product, and/or tagged the product at the location that the mobile device 402 is currently situated.

After identifying/detecting/recognizing merchandise objects, external actions can be performed by the user in the real world to interact with the detected merchandise objects. In one embodiment, such actions or requests from the user to perform a requested action on a merchandise object can be received by the user stimulus sensor 416. In one embodiment, the motion/gesture sensor 418 is operable to detect motion of the device 402. The detected motion is used by the user selection module 414 to perform actions responsive to the presented information according to the detected motion of the device. Motion detecting can include detecting velocity and/or acceleration of the device 402 or a gesture of the user handling the device 402. The motion/gesture sensor 418 can include for example, an accelerometer.

More specifically, with the merchandise object(s) identified, the mobile device 402 can present (e.g., using the user selection module 414 and/or audio/video output module 422) information relevant to the merchandise product or service to the user so that the user can initiate various actions responsive to the presented information, for example, initiating the transaction of the product or service via the mobile device 402. Other example actions can include, for example, get price, compare price, read reviews, get availability, add to shopping cart, call a sales representative (e.g., a local sales person or a virtual one) for assistance, buy the product, tag the product or add metadata for the product, share the product with another user, or bookmark the product for later consideration. The relevant information, including transaction information, can be transmitted from the repository 431, which may be local or may be hosted by an online server (e.g., host server 324,224, which may also include or be coupled to e-commerce server 213) that enables electronic commerce.

In some embodiments, a user interface generator in the user selection module 414 can be used to create buttons/ links/etc. that are selectable by the user. The interactions or actions from the user can be detected or determined using the user selection module 414 (e.g., via interpreting signals generated from the motion/gesture sensor 418, user stimulus sensor 416, and/or the environmental stimulus sensor 420).

Any response to the user's selection or action can be reflected (e.g., highlighting a selected merchandise, blinking of a selected button, displaying an annotation or review by another user, or displaying a short video clip of the selected merchandise) in the augmented reality environment via the audio/video output module 422.

In some embodiments, the information is rendered translucently and disposed adjacently or partially overlaid with the product or service depicted in the augmented reality environment on the mobile device 402. In some embodiments, the information includes advisory data associated with the product or service. Examples of advisory data can include metadata or tags that are deemed (either automatically by the object identifier module 412, or by another user, or by a merchant or an administrator) relevant to the product or service, or (ii) an annotation that is descriptive of the product or service.

The mobile device 402 can also prompt the user to enter an advisory data for the product or service by, for example, operating a virtual keyboard using the user stimulus sensor 416 and/or motion/gesture sensor 418. Then, the user can select to share (e.g., via network interface 404) the entry to another user of the augmented reality environment.

The content of the interactions can also be decided based on environmental factors including, for example, physical location of the user and/or the merchandise, user action, user feedback/annotation/review/tags/etc. as provided by the user of the device 402 or another user of the augmented reality platform using another device and/or at another physical location, motion/movement of the device 402, gesture of the user using the device 402.

In some embodiments, an advertisement relevant to the product or service can be identified and displayed in the augmented reality environment via the mobile device 402. The advertisement is identified or detected based on one or more of: (i) location, (ii) time, (iii) interest or profile of a user of the mobile device 402. For example, the environmental stimulus sensor 420 can detect environmental factors or changes in environmental factors surrounding the real environment in which the device 402 is located, and the advertisement can be provided based on these factors or changes. Environmental factors can include, weather, temperature, topographical characters, density, surrounding businesses, buildings, living objects, etc. These factors or changes in them can also affect the positioning and/or characters of the presented information for the merchandise objects in the augmented reality in which they are presented to a user via the device 402.

In some embodiments, the advertisement is identified or detected based on a pointing direction of the mobile device 402. In some embodiments, the advertisement is identified or detected based on velocity or speed of movement of the mobile device, or based on an ambient temperature in which the mobile device physically resides, or based on a plurality of sensors (e.g., sensors 407-410) on the mobile device 402. Further, the advertisement is identified or detected (e.g., by a combined reading and interpretation of data signals from the location sensor 408, the image sensor 409, and a directional sensor which may be included among other sensors 410) based on a landmark which the mobile device is pointed at or in a vicinity of.

In some embodiments, the information includes a contact information of a sales representative of the product or service, and the mobile device 402 prompts the user to contact the sale representative based on the contact information.

Additionally, in some embodiments, the mobile device 402 allows the user to bookmark the product or service, and in some embodiments, the mobile device 402 allows the user to share the bookmark with another user of the augmented reality environment.

According to some additional or alternative embodiments, the mobile device 402, in providing the augmented reality environment, can enable the user to select a physical product or service that is in the augmented reality. The mobile device 402 can detect one or more targets in the augmented reality platform using a select area on a perspective of a user. The perspective can be captured, for example, by a camera of the mobile device 402. After the targets are detected, the mobile device 402 prompts the user to choose an object of interest from the one or more detected targets.

More specifically, the mobile device 402 can detect one or more targets in the augmented reality platform using a select area in a perspective of a user, and prompt the user to choose an object of interest from the one or more detected targets. As previously mentioned, the perspective can be captured by the mobile device 402 (e.g., via the image sensor 409. For example, just as a user using a mouse to select items on a personal computer's screen, some embodiments disclosed herein enable selection of real and/or virtual items in an augmented reality environment/platform/marketplace, which in turn enables actions to be taken in relation to the selected items (e.g., the aforementioned transactions of or interactions with the merchandise objects).

The detection of targets can be performed, for example, by object identifier module 412 of the mobile device 402. According to some embodiments, the detection of targets in the augmented reality environment can be performed by pointing the device 402 at the target(s). In some embodiments, the detection of targets can be performed by moving a pointer or a select area on the display of the device 402 to point at or frame the object in a reticle or a circular or rectangular frame (e.g., select area 520, 525, described below with respect to FIG. 5A). It is noted that the select area can be any suitable shape and sizes. In some embodiments, the mobile device 402 can provide (e.g., via audio/video output module 422 to a display of the mobile device 402) the user with a lasso or a selection tool in the perspective to surround a respective target so as to form the select area. Additionally, the mobile device 402 can prompt the user to choose the object of interest from a set of choices such as a number of targets that are recognized in the perspective.

In some instances, for example, when target is not recognized automatically or when the user so desires, the mobile device 402 can prompt the user, or the user can select, to enter a learning mode in which the mobile device 402 can receive assistance from the user to perform the detection or recognition of the target. The assistance can include one or more of (i) entering at least partially a name, (ii) entering metadata, (iii) defining a boundary via a pointer, or (iv) taking snapshots from a plurality of views to develop a recognition pattern, for a respective target. For example, the teaching can be done by aiming at the target or circling around the target with the interface (e.g., using the select area or the lasso tool, provided by the interface generator module in the user selection module 414) on the device 402, and then by selecting a "learn" function or button on the interface in the augmented reality environment. Then, the mobile device 402 can ask the user for a name or other metadata for the target, and may ask for assistance in defining the boundaries of the object (e.g., via the lasso tool). The device 402 can also ask the user to take a series of snapshot views (e.g., via camera or image sensor 409) of the target to develop a pattern recognition database for it, as well as potentially a series of tests to improve recognition.

After targets are recognized, they can then be selected by the user for actions or interactions. The mobile device 402 can receive the user's choice of the object of interest by detecting movement and selection by a selection tool or a pointer, or movement and selection represented by a gesture (e.g., via the motion/gesture sensor 418, user stimulus sensor 416, and/or hand/finger/other gestures captured by the image sensor 409).

More specifically, in detecting the user's gesture to move a pointer or targeting or selection tool, and/or to select an object, the mobile device 402 can perform capturing, via its various sensors, the gesture from one or more of: (i) movements or non-movements of an eye of the user, (ii) locations of a focal point of an eye of the user, or (iii) movements of an eye lid of the user. Additionally, the mobile device 402 can capture the gesture from one or more of: (i) movements of hand or finger as recognized by a camera of the mobile device, (ii) movements of a virtual pointer controlled by a wireless peripheral device, (iv) movements of a virtual pointer controlled by a touch-sensitive display of the mobile device, (v) movements of the mobile device itself, or (vi) movements of the user's head, limbs, or torso. The capturing can be further based on a speed or velocity of the movements. As such, in light of the above, the present embodiments can capture or identify gestures from, for example, winking of the user and/or an eye focus or eye foci of the user. Another example of gesture controlling can include finger or arm gesturing as captured by camera and/or distance detector/proximity detectors, so that the user can perform "spatial" or "virtual" gesturing in the air or other detectable spaces with similar gestures as those well-known gestures applicable to a mobile phone's touch screen. Yet another example of gesture controlling can include eye ball motion tracking and/or eye focal point tracking. In this way, the user of mobile device 402 may operate various selection mechanisms, for example, using his or her eyes (e.g., via eye movement tracking) or by moving his or her hands/arms/fingers in the perspective to make specific gestures such as pointing or tracing the outline of some object, or by operating a virtual pointer in the scene using a handheld peripheral such as a wireless pointing device or a mouse equivalent, or by touching a touch-sensitive display on a mobile device and gesturing on it to indicate actions and selections, or by moving the device itself with specific gestures and velocities to use the device as a pointer or selection tool. Additional gestures may include eye tracking and determining a focus of the eye for targeting things, and/or blinking to select a target that is in the focal point, to take a photo, or to select a button, etc.

After receiving the user's selection or choice of the object of interest, the mobile device 402 can optionally confirm with the user of the choice of the object of interest. The confirmation can include highlighting or outlining the target in the augmented reality platform by employing, for example, the audio/video output module 422.

Figure 4B:
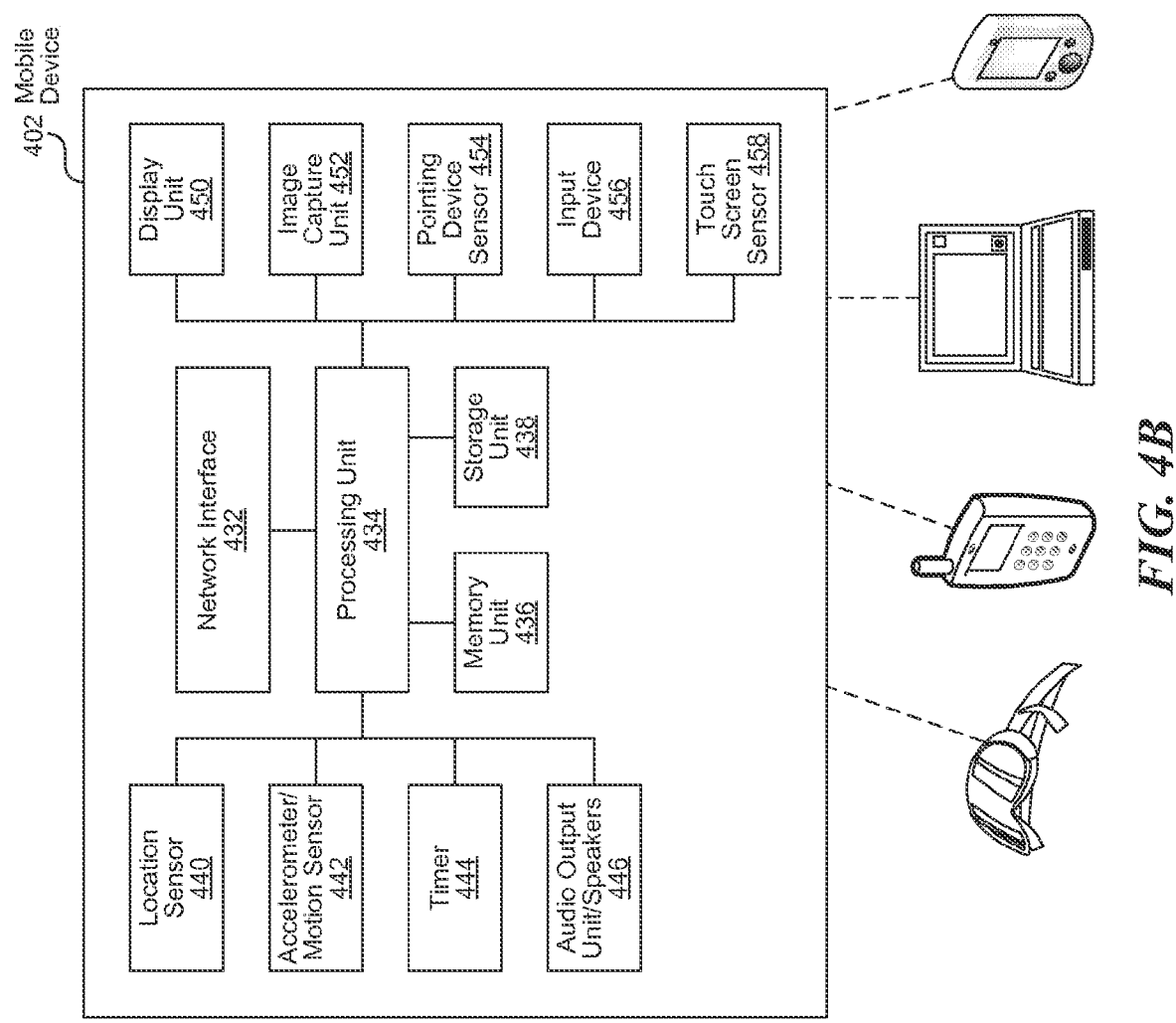
FIG. 4B depicts an example block diagram of the mobile device that presents augmented information with merchandise objects in the augmented reality marketplace to a user and facilitates user interactions with the objects based on the information.

FIG. 4B depicts an example block diagram of the mobile device 402 that presents augmented information with merchandise objects in the augmented reality marketplace to a user and facilitates user interactions with the objects.

In one embodiment, mobile device 402 includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, a input device 456, and/or a touch screen sensor 458. Additional or less units or modules may be included. The mobile device 402 can be any combination of hardware components and/or software agents for that presenting information with respect to merchandise objects to a user and facilitating user interactions with the merchandise objects. The network interface 432 has been described in the example of FIG. 4A.

One embodiment of the mobile device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the mobile device 402 for example, via the image capture unit 452, pointing device/sensor 554, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the mobile device 402 further includes a memory unit 436 and a storage unit 438. The memory unit 436 and a storage unit 438 are, in some embodiments, coupled to the processing unit 434. The memory unit can include volatile and/or non-volatile memory. In generating and controlling access to the simulated objects, the processing unit 434 may perform one or more processes related to presenting information with respect to merchandise objects to a user and/or facilitating user interactions with the merchandise objects based on the presented information.

In some embodiments, any portion of or all of the functions described of the various example modules in the mobile device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

FIG. 5A illustrates an example application where mobile devices 502 such as a smart phone 502A or a smart goggle 502B having perspective interfaces 510,515 which can be used to facilitate electronic commerce in an augmented reality marketplace.

With the embodiments disclosed herein, for example, when the user is doing "window shopping," that is, when the user is looking at a merchandise product in a store window, or on a shelf, or when the user is near a physical store, the user can utilize the mobile devices 502A, 502B to access information 504A, 504B regarding the identified/detected/recognized merchandise objects. The merchandise objects can be selected using select areas 520, 525 in ways that are discussed above. Then, the user can select to perform actions 506 (including transactions) to the merchandise objects in ways that are discussed above. Thus, for example, through the perspective interface 510, 515 in the augmented reality environment, the user can get price of, add comments/annotations/tags for, read reviews of, get availability of, or select to purchase the selected merchandise object. The objects can be identified by ways discussed above including, for example, a barcode 508 attached to the merchandise object. Written materials for identifying objects and/or other relevant information (such as sales event information 530 as illustrated in FIG. 5A) can also be recognized/detected by the mobile devices 502A, 502B.

Other example augmented information can be provided to the user to inform the user if the store is now open, what is on sale now, etc. Similarly, other sales information including advertisement, video clips, images, or sales representative's contact information can be presented or otherwise made accessible to the user. The information can also include entries from other users of the augmented reality, including but not limited to, their names and profiles, recent blog or microblog posts, recent photos or videos or links or documents added or annotated by them, their recent locations, their professions, etc.

FIG. 5B illustrates an example screenshot on a device 502 displaying an augmented reality environment 520 with objects 522 (including merchandise objects) associated with physical objects and/or real life services 526 in a real world environment 524.

As aforementioned, augmented reality environment 520 reflects a perspective of the user as captured by the mobile device 502 (e.g., via a camera of the device 502). As such, the display and movement of the object 522 in the augmented reality environment 520 corresponds to the display and movement of the physical object 526 (e.g., car) in the real world 524.

In augmented reality environment 502, relevant information regarding the physical object 526 can be rendered or presented with the object 522 so as to "augment" the object 522. Such information or data can be about the people or entities that are in or near a particular geographical location. Further, the mobile device 502 can facilitate transactions of the real physical product or service 526 based on the information, so that transactions can be conducted by users via devices when the user is physically near or at the physical product or the real life service.

Figure 6:
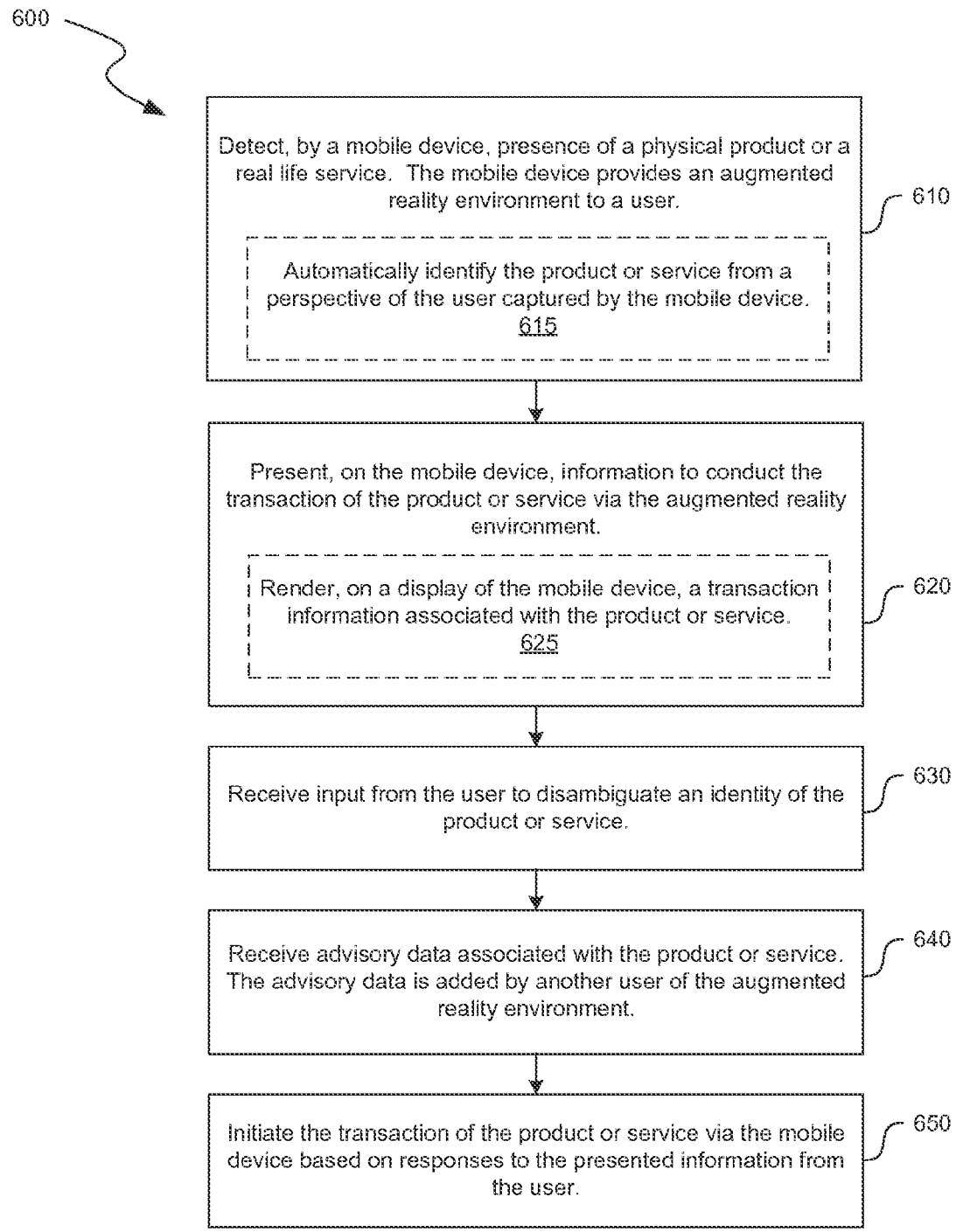
FIG. 6 depicts a flow chart illustrating an example process for facilitating user interaction with a merchandise object that is identified in an augmented reality environment.

FIG. 6 depicts a flow chart illustrating an example process 600 for facilitating user interaction with a merchandise object that is identified in an augmented reality environment. With reference to FIGS. 1, 3A, 4A, and 5A, process 600 is now described.

First, a mobile device (e.g., devices 102A-102N, FIG. 1; device 402, FIG. 4; devices 502A, 502B, FIG. 5A) detects (610) presence of a physical product or a real life service. The mobile device 102, 402, 502 provides the augmented reality environment (e.g., through perspective interfaces 510,515, FIG. 5A) to the user. In some embodiments, the device 102,402, 502 automatically identifies (615) the product or service from the perspective 510, 515 of the user captured by the mobile device (e.g., via image sensor 409, FIG. 4A).

Then, the mobile device 102,402, 502 can query a merchandise object repository (e.g., repository 132, FIG. 1; repository 332, FIG. 3A; repository 431, FIG. 4A) in identifying the merchandise product or service and obtaining relevant information. Thereafter, the mobile device 102,402, 502 presents (620), on the mobile device (e.g., on user interface 104A-104N, FIG. 1, or on perspective 510,515), information (e.g., information 504A, 504B, FIG. 5A) to conduct the transaction of the product or service via the augmented reality environment. In some embodiments, the device 102, 402, 502 renders (625), on a display of the mobile device (e.g., via audio/video output module 422, FIG. 4A), a transaction information associated with the product or service.

Next, in some embodiments, the mobile device 102,402, 502 can receive (630) input from the user to disambiguate an identity of the product or service. Further, in some embodiments, the mobile device 102,402, 502 can receive (640) advisory data associated with the product or service. The advisory data can be added, for example, by another user of the augmented reality environment.

After the information is presented, the mobile device 102,402, 502 can initiate (650) the transaction of the product or service via the mobile device based on responses to the presented information (e.g., as detected via various sensors 406-410, 416,418,420 of device 402 and determined by the user selection module 414, FIG. 4A) from the user.

Figure 7:
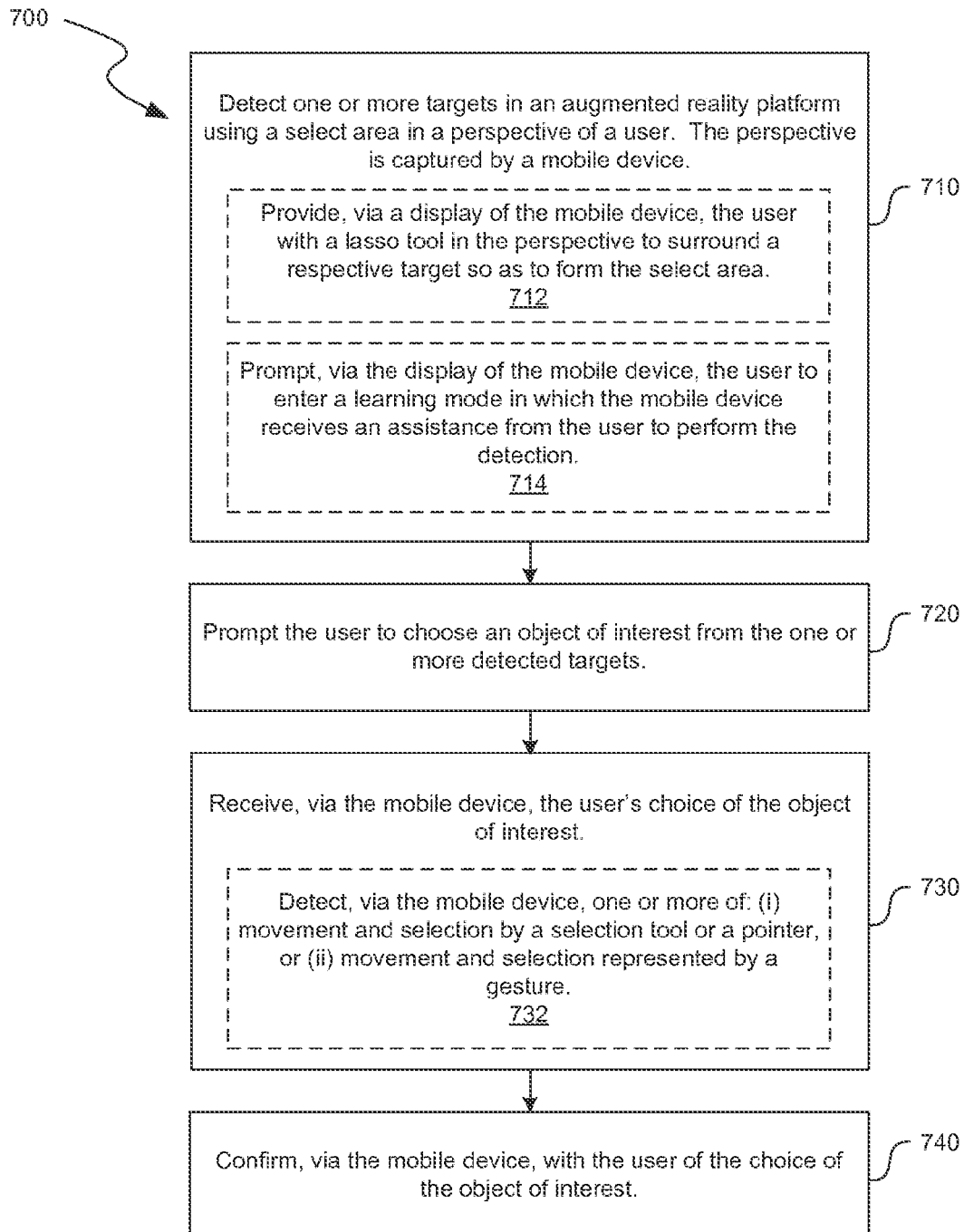
FIG. 7 depicts a flow chart illustrating an example process for selecting/identifying a merchandise object in an augmented reality environment.

FIG. 7 depicts a flow chart illustrating an example process 700 for selecting/identifying a merchandise object in an augmented reality environment. With reference to FIGS. 1, 3A, 4A, and 5A, process 700 is now described.

First, a mobile device (e.g., devices 102A-102N, FIG. 1; device 402, FIG. 4; devices 502A, 502B, FIG. 5A) detects (710) one or more targets in an augmented reality platform using a select area (e.g., select areas 520, 525, FIG. 5A) in a perspective (e.g., perspective 510, 515, FIG. 5A) of a user. The perspective 510, 515 is captured by the mobile device 102, 402, 502 (e.g., via image sensor 409, FIG. 4A). In some embodiments, the mobile device 102,402, 502 provides (712), via a display of the mobile device (e.g., via audio/video output module 422, FIG. 4A), the user with a lasso tool in the perspective 510, 515 to surround a respective target so as to form the select area 520, 525. In accordance with some embodiments, the mobile device 102,402, 502 prompts (714), via audio/video output module 422, the user to enter a learning mode in which the mobile device 102, 402, 502 receives (714) an assistance from the user to perform the detection.

After detecting the targets, the mobile device 102,402, 502 prompts (720) the user to choose an object of interest from the one or more detected targets. Then, the mobile device 102,402,502 receives (730) the user's choice of the object of interest (e.g., via motion/gesture sensor 418, user stimulus sensor 416, and/or other gestures captured by image sensor 409, as determined by the user selection module 414, FIG. 4A). The mobile device 102,402, 502 can detect (732) movement and selection by a selection tool or a pointer, and/or movement and selection represented by a gesture. Additionally, the mobile device 102,402, 502 can confirm (740) with the user of the choice of the object of interest.

Figure 8:
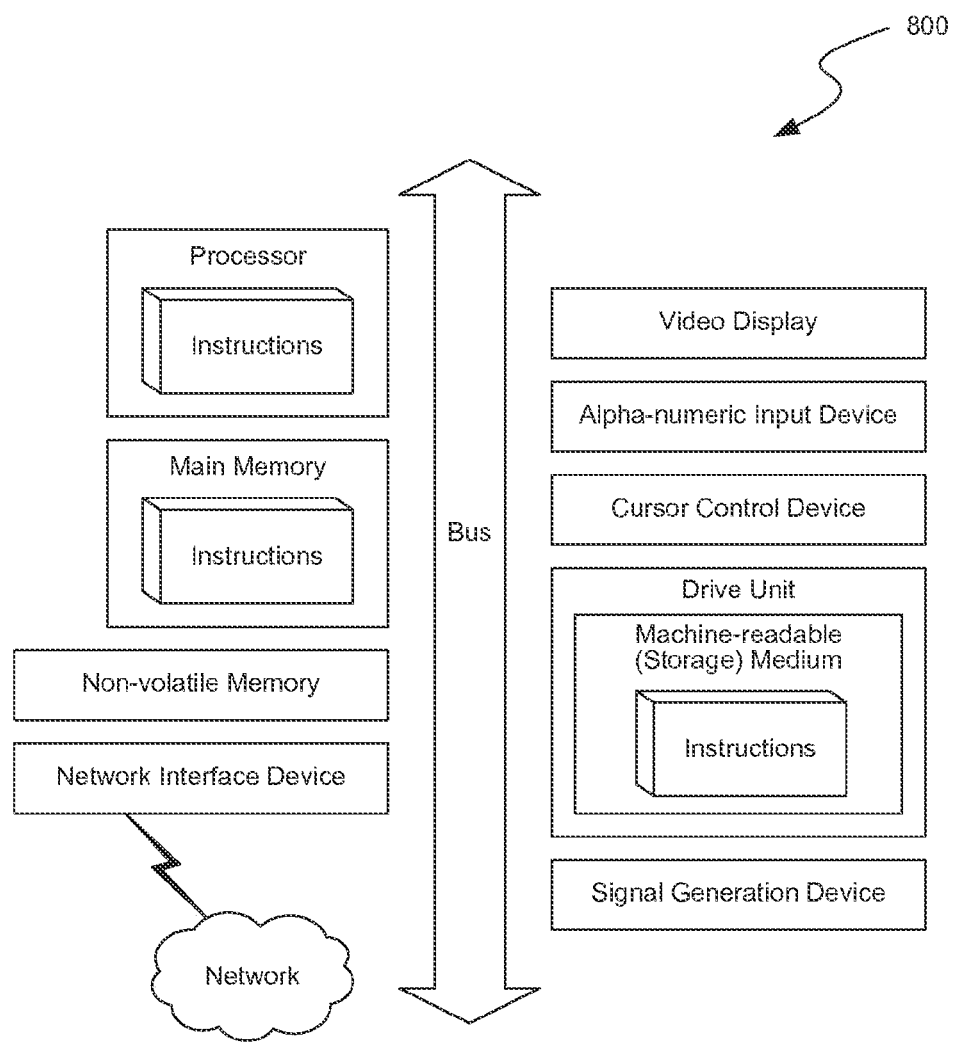
FIG. 8 depicts a diagrammatic representation of a machine in the example form of a computer system within which a set of instructions, for causing the machine to perform any one or more of the methodologies discussed herein, may be executed, according to some embodiments.

FIG. 8 shows a diagrammatic representation of a machine in the example form of a computer system 800 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 6, other aspects may likewise be embodied as a means-plus-function claim, or in other forms, such as being embodied in a computer-readable medium. (Any claims intended to be treated under 35 U.S.C. § 112, 6 begins with the words "means for".) Accordingly, the applicant reserves the right to add additional claims after filing the application to pursue such additional claim forms for other aspects of the disclosure.

What is claimed is:

1. A mobile device comprising:
a touch-sensitive display;
a camera;
a processor; and
a memory coupled to the processor and storing instructions which, when executed by the processor, cause the mobile device to:

display an image, being captured via the camera,
detect presence of one or more physical objects in the image,
obtain identifying information associated with the one or more physical objects present in the image,
enter a mode in which the mobile device receives an assistance from a user to select a target,
display a selection tool in the image to form a select area,
receive a user input for moving the selected tool or changing a size of the selected tool,
selecting the target from the one or more physical objects present in the selected area,
in response to selecting the target, transmit the identifying information associated with the selected target to an external device, and
based on information of a product corresponding to the selected target received from the external device, display information for conducting a transaction of the product,
wherein the displayed information comprises information regarding the product.

2. The mobile device of claim 1, wherein the memory further stores instructions which, when executed by the processor, cause the mobile device to:
prompt, via the touch-sensitive display, the user to enter the mode in which the mobile device receives assistance from the user to perform the detection.

3. The mobile device of claim 2, wherein the memory further stores instructions which, when executed by the processor, cause the mobile device to:
provide, via the touch-sensitive display, the user with the selection tool in a perspective to form the select area, and
receive a user input for selecting target corresponding to the selected area by using the selection tool.

4. The mobile device of claim 3, wherein the memory further stores instructions which, when executed by the processor, cause the mobile device to:
receive a user input for moving the selected area, and
change another target based on the user input.

5. The mobile device of claim 3, wherein the memory further stores instructions which, when executed by the processor, cause the mobile device to:
receive a user input for changing a size of the selected area, and
detect the target based on the selected area resized.

6. The mobile device of claim 1, wherein the displayed information comprises an advertisement regarding the product and another similar product relating to the product.

7. The mobile device of claim 1, wherein the displayed information comprises at least one of purchase information, price information or vendor information of the product and another similar product relating to the product.

8. The mobile device of claim 1, wherein the memory further stores instructions which, when executed by the processor, cause the mobile device to:
detect the presence of the one or more targets in the selected area based on geolocation information of the mobile device.

9. A method for selecting a target representing a physical object, via a mobile device, the method comprising:
displaying an image, being captured via a camera of a mobile device;
detecting presence of one or more physical objects in the image;
obtaining identifying information associated with the one or more physical objects present in the image;
entering a mode in which the mobile device receives an assistance from a user to select a target;
display a selection tool in the image to form a select area;
receiving a user input for moving the selected tool or changing a size of the selected tool;
selecting the target from the one or more physical objects present in the selected area;
in response to selecting the target, transmitting the identifying information associated with the selected target to an external device; and
based on information of a product corresponding to the selected target received from the external device, displaying information for conducting a transaction of the product,
wherein the displayed information comprises information regarding the product and another similar product relating to the product.

10. The method of claim 9, wherein the method further comprises:
prompting, via a touch-sensitive display of the mobile device, the user to enter the mode in which the mobile device receives assistance from the user to select the target.

11. The method of claim 10, wherein the method further comprises:
providing, via the touch-sensitive display, the user with the selection tool in a perspective to form a select area; and
receiving a user input for selecting the target corresponding to the selected area by using the selection tool.

12. The method of claim 11, wherein the method further comprises:
receiving the user input for moving the selected area; and
changing another target based on the user input.

13. The method of claim 11, wherein the method further comprises:
receiving the user input for changing a size of the selected area; and
detecting the target based on the selected area resized.

14. The method of claim 9, wherein the displayed information comprises an advertisement regarding the product and another similar product relating to the product.

15. The method of claim 9, wherein the displayed information comprises at least one of purchase information, price information or vendor information of the product and another similar product relating to the product.

16. The method of claim 9, wherein the method further comprises:
detecting the presence of the one or more targets in the selected area based on geolocation information of the mobile device.

* * * * *